United States Patent [19]

Ellis

[11] Patent Number: 4,473,740
[45] Date of Patent: Sep. 25, 1984

[54] DUAL TEMPERATURE RESPONSIVE CONTROL FOR AIR OUTLET OF ELECTRIC HEATER WITH HEAT STORAGE CAPACITY

[75] Inventor: Gordon Ellis, Uttoxeter, England

[73] Assignee: Ti Creda Manufacturing Limited, Stoke-on-Trent, England

[21] Appl. No.: 135,745

[22] Filed: Mar. 31, 1980

[30] Foreign Application Priority Data

Apr. 3, 1979 [GB] United Kingdom ............... 7911598

[51] Int. Cl.³ ............................................. H05B 1/00
[52] U.S. Cl. .................................. 219/378; 219/365; 219/341
[58] Field of Search ...................... 219/378, 365, 341; 236/91 A; 165/18, 40; 126/400

[56] References Cited

U.S. PATENT DOCUMENTS

| 378,435 | 2/1888 | Corman | 236/91 A |
|---|---|---|---|
| 720,722 | 2/1903 | Meister | 236/91 A |
| 998,767 | 7/1911 | Fulton | 165/40 |
| 2,666,298 | 1/1954 | Jones | 236/91 A |
| 2,998,707 | 9/1961 | Meess et al. | 236/91 A |
| 3,581,058 | 5/1971 | Romano | 236/91 A |
| 4,097,719 | 6/1978 | Olsen et al. | 219/378 |

FOREIGN PATENT DOCUMENTS

| 763761 | 8/1981 | Belgium . | |
|---|---|---|---|
| 2063125 | 11/1970 | Fed. Rep. of Germany | 219/378 |
| 2015993 | 10/1971 | Fed. Rep. of Germany . | |
| 2250958 | 3/1974 | Fed. Rep. of Germany | 219/378 |
| 746316 | 5/1933 | France . | |
| 1537282 | 7/1968 | France . | |
| 759049 | 10/1956 | United Kingdom | 219/341 |
| 1023773 | 3/1966 | United Kingdom | 219/378 |
| 1048470 | 11/1966 | United Kingdom . | |
| 1065662 | 4/1967 | United Kingdom | 219/365 |
| 1100878 | 1/1968 | United Kingdom . | |
| 1108738 | 4/1968 | United Kingdom . | |
| 1203614 | 8/1970 | United Kingdom . | |
| 1231400 | 5/1971 | United Kingdom . | |
| 1375545 | 11/1974 | United Kingdom | 219/378 |

Primary Examiner—Bernard Roskoski
Attorney, Agent, or Firm—Merriam, Marshall & Bicknell

[57] ABSTRACT

A storage heater of the kind which is heated from a source of electricity made available only over an off-peak (low tariff) period, and of the kind which does not require a supply of power during operation outside the off-peak period. The heater comprises a body, a heat store within the body, electrical heating means for the store, air passages extending through the store from an inlet to an outlet, through which air is caused to flow in the operation of the heater solely by convective pressure, and a flow control damper or flap mounted adjacent to the outlet for controlling flow of air from the heater. The heater additionally comprises an operating means to control the flow control damper, said operating means comprising a first thermo-responsive device mounted at a position at which it is primarily responsive to the temperature of the store, and a second thermo-responsive device mounted at a position where it is traversed by air flowing through the inlet into the heater, the combined functional output of the thermo-responsive devices determining the position of the flow control damper. In this manner, operation of the flow control damper is dependent both on the heater core temperature and on the air temperature of the room in which the device is operating.

15 Claims, 5 Drawing Figures

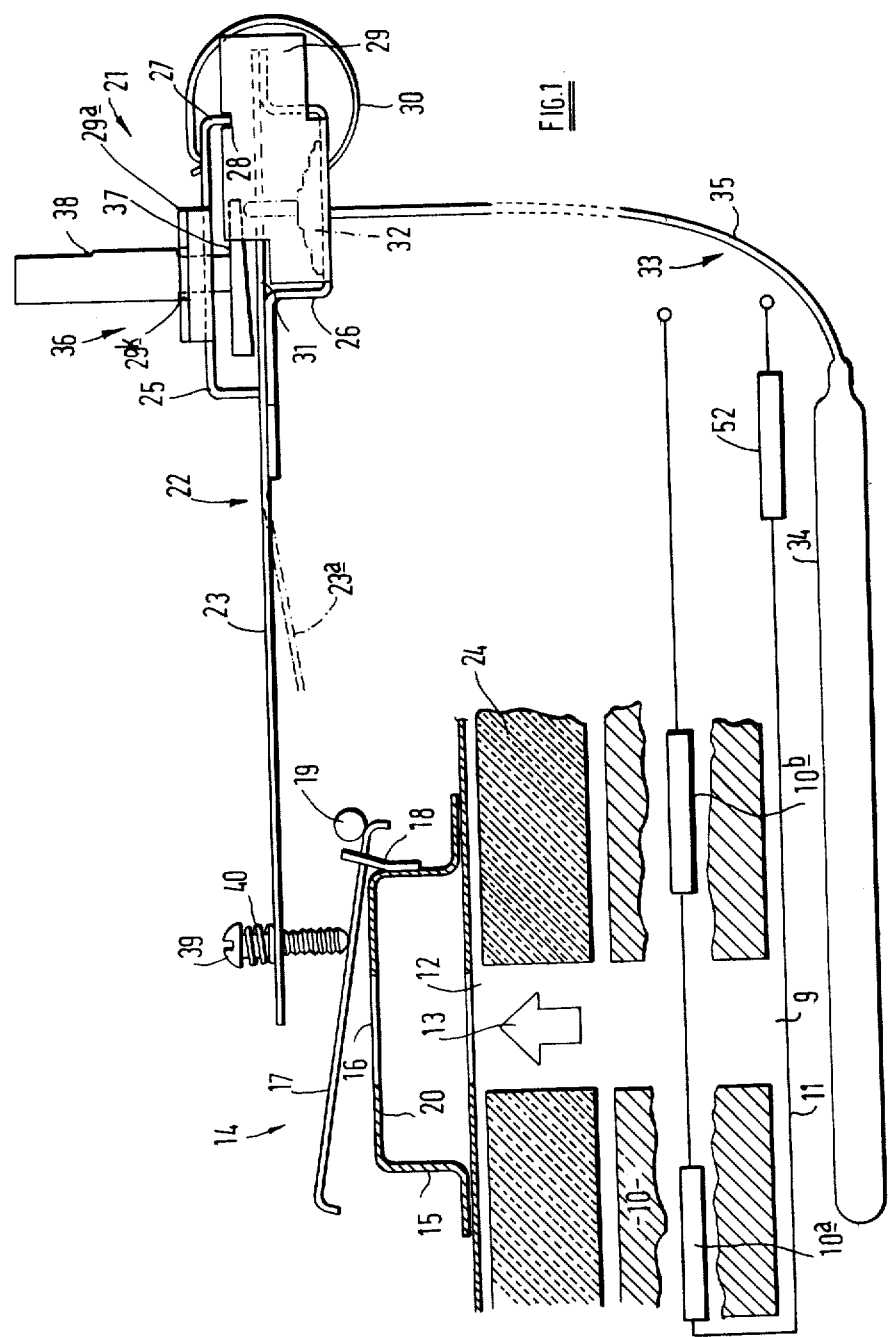

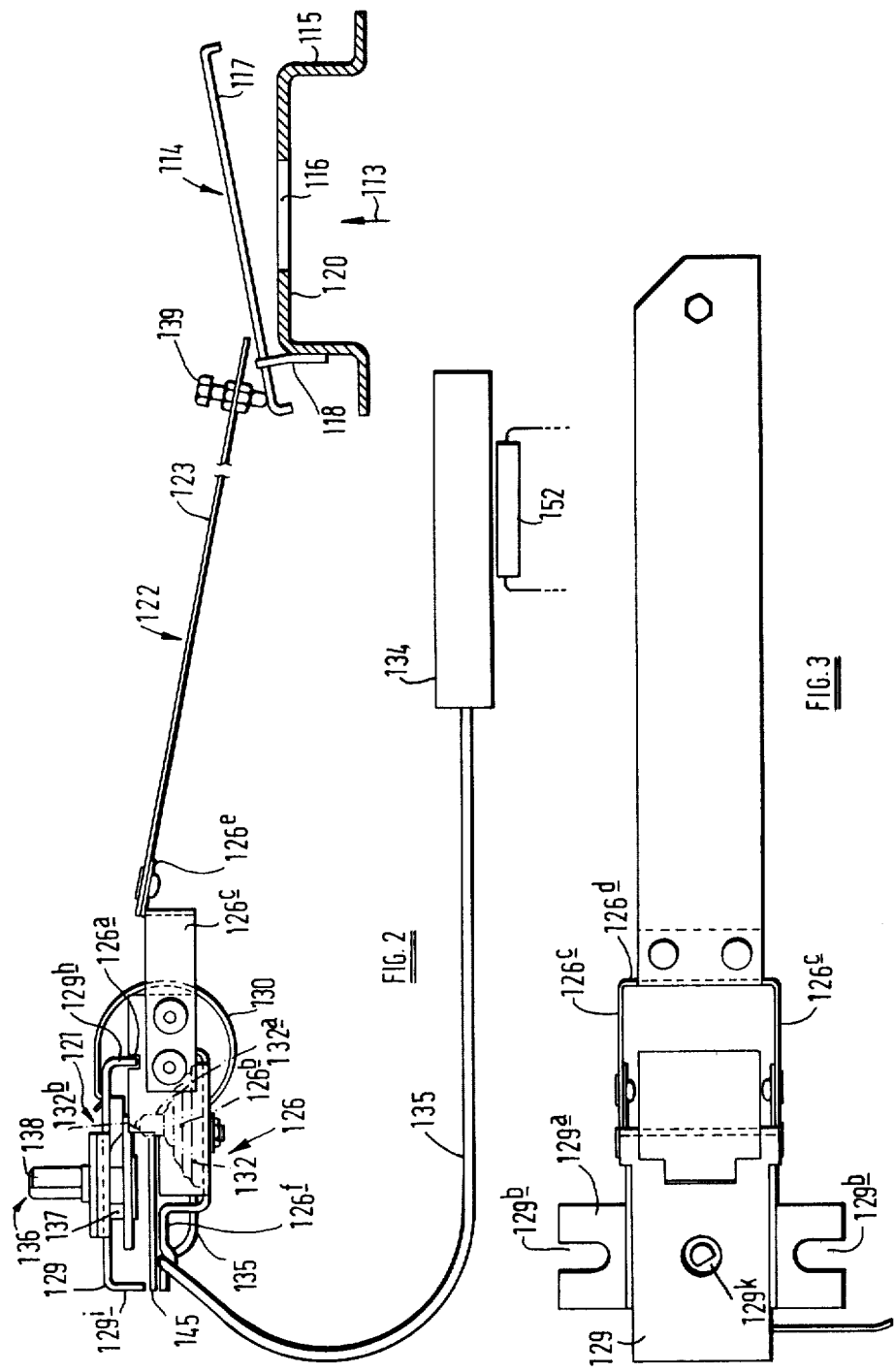

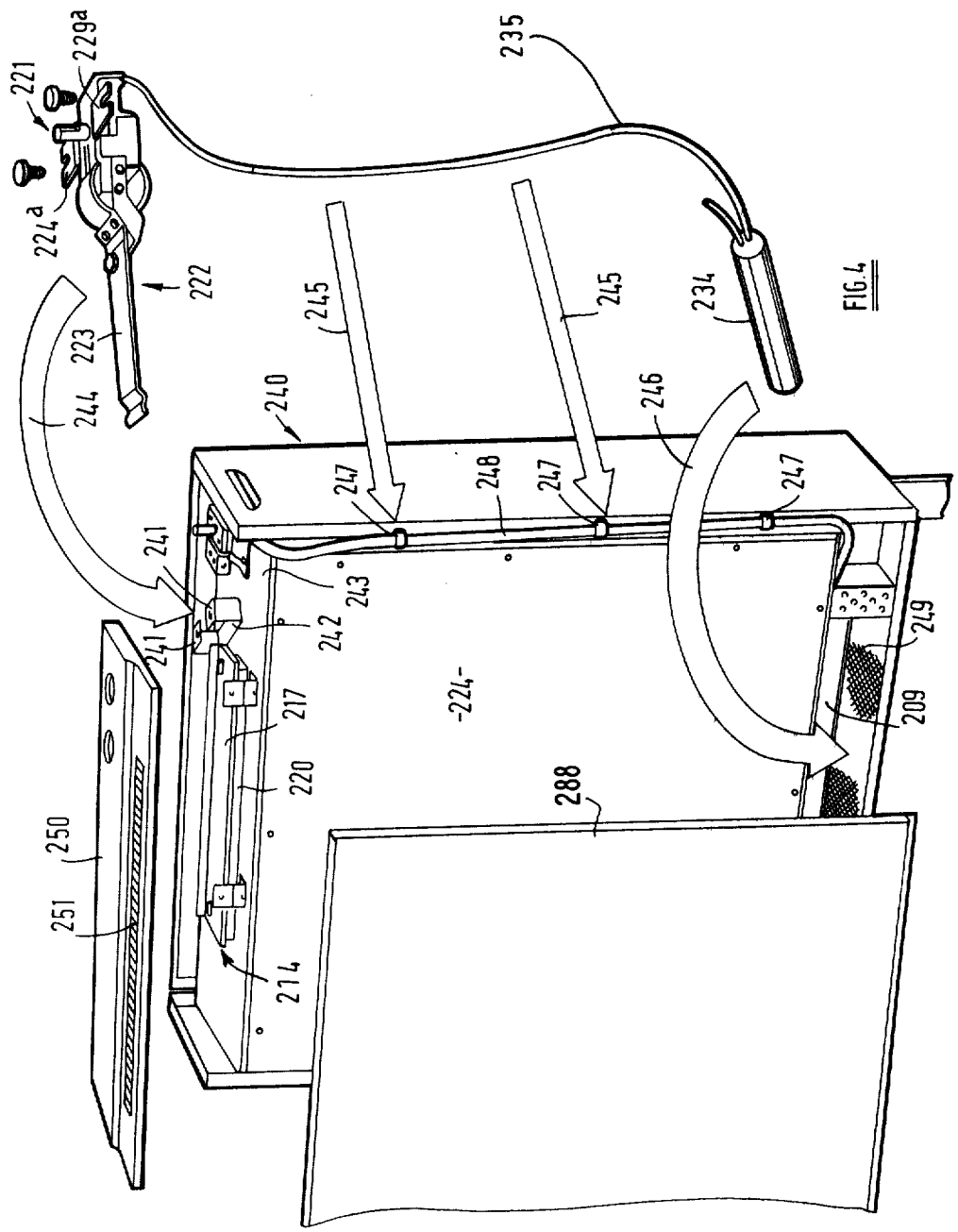

DUAL TEMPERATURE RESPONSIVE CONTROL FOR AIR OUTLET OF ELECTRIC HEATER WITH HEAT STORAGE CAPACITY

BACKGROUND OF THE INVENTION

This invention relates to heaters (hereinafter referred to as being of the kind specified) each comprising a heat store, electrical heating means for heating same, means providing for flow of air or other heat distributing fluid (herein for convenience referred to as air) into contact with the heat store and thereafter to a space or place to be heated, and flow control means for controlling the flow of such air.

The electrical heating means is ordinarily powered from an electrical supply source (herein called the off-peak supply) which is operative, i.e. rendered live, by time controlled switch means not accessible to the user for one or more restricted periods (herein called off-peak periods) during each basic 24 hour period. One of such off-peak periods which is frequently utilised extends from 2300 hrs. to 0700 hrs. and in some cases a second off-peak period is provided extending from 1300 hrs. to 1500 hrs.

During other periods (herein called on-peak periods) heat is required to be delivered from the heat store to the space to be heated and the temperature existing in this space during on-peak periods is often subjected to considerable short term fluctuations, e.g. the temperature may rise due to solar heating, especially when the space is bounded in part by an extensive glazed window area, and the temperature may fall sharply when there is a sudden decrease in weather temperature external to the space, especially when accompanied by high winds.

Heaters of the kind specified commonly include a flow control means in the form of a damper for controlling the flow of the heat distributing air and the position of the damper is determined by firstly the state of charge (temperature) of the heat store, and secondly by a user operated control. Control of the position of the damper as a function of state of charge is necessary to prevent a high flow rate of heat distributing air when the heat store is fully charged, partly because this could be unsafe and partly because it would be wasteful. The user control provides shift of the damper position (once it is open) to a position of greater or lesser opening as desired subjectively by the user.

When the user is absent, however, fluctuations in temperature in the space to be heated arising from factors such as those already mentioned are not catered for, and a user returning to the premises after a period of absence may find the space to be heated well above or well below the desired temperature.

One object of the present invention is to provide simple and reliable means capable of being manufactured at low cost and not requiring drawing of current from the on-peak supply for overcoming or mitigating this problem.

SUMMARY OF THE INVENTION

According to one aspect of the present invention, there is provided an improved electric generated heat storage heater having a control for controlling air flow through the heater. The control, which constitutes a second aspect of the invention, is operated by a first thermo-responsive device responsive to a temperature varying as a function of store temperature, and a second thermo-responsive device responsive to the temperature of the space or place to be heated. Preferably, the first and second thermo-responsive devices each provides an output force, with both forces functioning to operate the control. The two forces can be separately applied or they can be applied in combination.

It is preferred also that the thermo-motive means shall be of a form such that the respective energy inputs thereto are from a heat source in the environment in which the heater operates. Thus, such heat source may include the heat store and the atmosphere of space or place to be heated. Thus, no electrical input is required to control delivery of heat during the on-peak periods.

In a preferred arrangement according to the invention the first means is mounted on, or in relation to, the heater at a position at which it partakes of temperature rise and temperature fall of the heat store but the maximum temperature to which the first means is subjected is substantially lower than the temperature of the heat store when the latter is fully charged. Thus, the first means may comprise a thermo-motive means including a heat sensing element which is mounted in thermal communication with the heat store through the intermediary of material of low thermal conductivity (e.g. normally classed as a heat insulating material).

It is common practice for the heat store to be partly or wholly enclosed by heat insulating material and said thermo-motive means may have its heat sensing element mounted adjacent to, or in contact with, said heat insulating material. This may be either at the outer surface thereof or at some intermediate position in the thickness of said material but spaced from the heat storage body.

It will be understood that the first temperature responsive means need not be responsive exclusively to a temperature varying as a function of the store temperature. It may be advantageous for this temperature responsive means to be so mounted that it also responds to the temperature of air circulating through the heater and undergoing heating therein by reason of heat loss from the store through the heat insulating material, this circulating air flowing through the space to be heated.

Similarly it is not essential for the second temperature responsive means to respond exclusively to the temperature of the space or place to be heated (e.g. the air flowing therethrough). It may be so mounted as to be responsive to heat loss transmitted through heat insulating material enclosing the store.

With these arrangements the second temperature sensing means will tend to be influenced predominantly by the temperature of the space or place to be heated when the heater is in operation during an on-peak period and air flow is established in contact with the heat store itself (as distinct from coming into contact only with heat insulating material enclosing the heat store). During the off-peak period, however, when little or no air flow takes place in contact with the heat store itself but air flow does take place in contact with heat insulating material enclosing the heat store, the second temperature responsive means may be influenced more by the temperature of the store itself transmitted through the heat insulating material.

With regard to the first temperature responsive means, this will tend to respond predominantly to store temperature during the on-peak period when air flow takes place in contact with the store itself, and it will be more influenced by air circulating through the space or place to be heated and having contact with the heat insulating material during the off-peak periods when charging of the store is taking place.

A further feature of the invention is that said second temperature responsive means may itself be arranged to be also responsive to charging, i.e. electrical energisation, of the heat store and to bring about movement of the flow control means towards or into a position of closure during charging.

Thus, the second thermo-motive means may be responsive to heating by passage of an electrical current established during charging of the heat store. Such current may be that supplied from the off-peak supply to the heating means for the store, either through a conductor (not specifically designed as a heating element) or through a heating element included in the supply circuit connecting the heating means for the store with the off-peak supply. This ensures that heat from the store to the space to be heated is not transmitted during off-peak periods when the store is undergoing charging.

From a further aspect the present invention resides in the provision of an operating assembly for operating the flow control means in or for a heater of the kind specified, such assembly comprising:

a. a mounting means for mounting the assembly on the heater,
b. an arm movably projecting from the mounting means and having a first part spaced therealong from the mounting means to cooperate with the control means, and a second part movably supported by the mounting means,
c. a first thermo-motive means for causing the first part of the arm to deflect and bring about movement of the control means from an open position towards a closed position in response to rise of heat store temperature,
d. a second thermo-motive means operating between the mounting means and the arm for causing the the arm to deflect and bring about movement of the control means from its open position towards its closed position in response to temperature rise of the space to be heated.

Thus the first part of the arm itself may be formed as a bimetal member or structure. It may be supported from the mounting means for angular movement in response to operation of the second thermo-motive means acting effectively between the second part of the arm and the mounting means, deflection of the first part of the arm by virtue of heating of the bimetal member or structure and deflection of the arm by virtue of temperature changes to which the second thermo-motive means responds, having respective components of movement in a common plane.

BRIEF DESCRIPTION OF DRAWINGS

The invention is illustrated in the accompanying drawings wherein:

FIG. 1 is a view in side elevation and partly in section of one embodiment of the invention showing a fragment of the heater and an assembly for operating the flow control means;

FIG. 2 is a view in side elevation of an alternative embodiment of the assembly;

FIG. 3 is a plan view of the assembly shown in FIG. 2;

FIG. 4 is a perspective partly "exploded" view showing the manner of mounting a control means on a heater of the kind specified, such control means being a modified form of the embodiment of FIGS. 2 and 3;

DESCRIPTION OF THE PREFERRED EMBODIMENT

Figure 5:
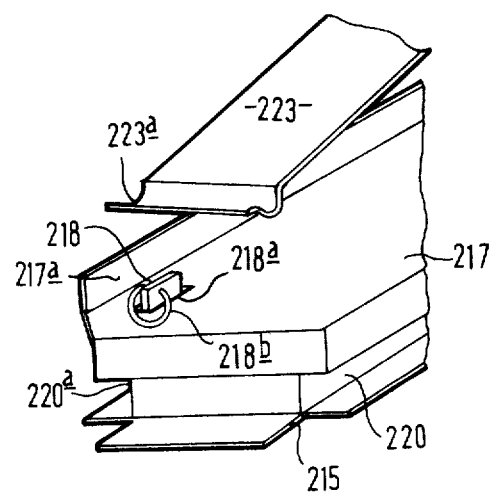
FIG. 5 is a fragmentary enlarged perspective view showing the manner of cooperation between the arm of the control means and the flap element controlling air flow from the heater.

The embodiment of FIG. 1 comprises a heater of the kind specified which may be of generally conventional construction except for the means for operating the air flow control means. Such heater may comprise a solid state body or store of which a fragment is seen at 10 which incorporates a system of passageways such as 11 through which the heat distributing air can flow between an inlet 9 and an outlet 12 as indicated by arrow 13. The flow of air may be established convectively.

The control means provided comprises a damper 14 which in the embodiment shown in FIG. 1 comprises a seat element 15 having an opening 16 through which the air can flow, and a flap element 17 connected to the seat element 15 by a hinge 18 for movement between an open position (as shown) towards which it is biased by a counterweight 19, and a closed position in which the flap element lies on top of the flange 20 of the seat element 15 and effectively closes the opening 16.

The damper is operated by an assembly 21 which includes two thermo-motive means which provide the necessary force to operate the damper. During the "on-peak" period when the heater is used to supply heat to the space to be heated, one of these thermo-motive means is responsive primarily to the temperature of the store 10 (and hence to the state of charge of the latter), and the other thermo-motive means is responsive primarily to temperature in the space to be heated, e.g. room temperature.

The assembly comprises an arm 22 including a first part formed from a bimetal strip 23 and which is deflected angularly in a downward direction to a position indicated typically, in respect of part only of the arm, by the broken lines 23a. Heat is transmitted to the arm from the store 10 through heat insulating material 24 which substantially surrounds the store. Such heat is transmitted partly by radiation from the outer surface of the heat insulating material and partly by convection of air which is heated by this surface. When the flap element 17 is in its open position some air emergent from the opening 16 may impinge on the arm 23. The temperature to which the arm is raised is, however, substantially less than the temperature of the store when the latter is fully charged. Typically the maximum temperature of the arm would be in the region of 100° C. when the temperature of the store is in the region of 700° C., but when the store cools to its lowest operating temperature 100° C., the arm would approach ambient temperature. Thus the arm will change through a range of temperatures in response to and as the store changes through a range of temperatures, but the former range will be appreciably smaller than the latter and will have a lower maximum value.

The arm further comprises a second part in the form of an attachment means or structure including an upper pivot element 25 and a lower carrier element 26, both secured in any suitable manner to the bimetal strip 23.

The pivot element 25 has a downardly extending flange 27 which is received in a groove 28 formed in the upper surface of a mounting means which comprises a block 29 secured to any suitable part of the fixed structure of the heater. The arm together with the attachment means or structure can thus pivot in a vertical plane about an axis extending lengthwise of the groove 28 and situated in the plane of the bottom face of the groove.

The arm 22 is retained in assembled relation with the block 29 by a C-shaped spring 30, the upper end of which engages the upper side of the upper pivot element 25 and the lower end of which engages the underside of the block 29.

The carrier element 26 forms, in combination with the part 31 of the bimetal strip 23, a pocket or housing for the reception of a transmitter element 32 of a second thermo-motive means 33 which has a sensor 34 such as a phial placed at any suitable position to sense room temperature, e.g. at the inlet for air circulating through the heat store. The phial 34 is connected by a tube 35 to the transmitter element 32 which may be in the form of a bellows or capsule. Thermal expansion of the fluid contained in the phial 34 produces expansion of the bellows 32, the upper extremity of which bears against the underside of a cam element 37 hereinafter referred to, and the base of which bears against the underlying wall of the carrier element 26, so that increase in room temperature tends to rock the arm 22 in a downward direction.

The assembly further comprises an adjustment means 36 which is operable manually by the user and comprises the cam element 37 having, as its cam face, an undersurface lying in a helical plane and bearing against the bellows as mentioned. The cam element is rotatable by a spindle 38 mounted in a part 29a which may be part of or secured to the block 29 and has a bearing 29k which permits rotation of the spindle but holds it in a fixed axial position. The part 29a may be a bracket of inverted U-shape straddling the pivot element 25. The latter has an opening through which the spindle 38 passes with clearance so that pivotal movements of the arm 22 is not obstructed.

At its end remote from the mounting means the arm 22 serves to bear downwardly on the flap element 17 of the damper preferably through the intermediary of an adjustment element such as a screw 39 carrying a spring 40 preventing inadvertent rotation from an adjusted position by imposing frictional constraint on rotation.

Angular deflection of the arm is produced in response to both temperature rise of the bimetal strip and temperature rise of the room sensor 34. The two angular deflections take place in a common plane, i.e. the vertical plane, and are additive. Operation of the adjustment means 36 also produces angular deflection of the arm in the same plane.

Ordinarily, with the user adjustment means 36 set at a minimum value, i.e. "coldest" position, a "high" part of the cam element 37 will be in contact with the bellows 32 and the arm will be depressed to the maximum extent. It will be understood that the undersurface (helical) of the cam element 37 is in separable contact with the upper end of the bellows 32. The screw 39 is then adjusted so that the flap element is in its closed position for a store temperature of minimum value.

In operation, and when the room concerned is to be occupied, the user will set the adjustment means 36 to an appropriate position at or intermediate its "coldest" and "warmest" positions, the former being intended to be used when the room is to remain unoccupied, and the latter when the room is intended to be occupied and outside weather conditions demand maximum heating. The range of adjustment provided by the adjustment means 36 is such that in the "coldest" position, when the "high" part of the cam is in use, the flap element remains permanently closed throughout the on-peak period.

When the store is fully charged the bimetal strip 23 will remain deflected in a downward direction and the flap element 17 will be closed under pressure. The bending stress in the bimetal strip 23 will be established partly by its tendency to deflect downwardly due to its own temperature, and partly by pressure exerted by the bellows 32. When the bimetal strip senses a reduction of store temperature then closure pressure of the flap element 17 against its seat will be reduced and eventually become zero when this temperature is both safe for flap element opening and room temperature no longer causes the bellows to maintain the closure pressure. The flap element 17 will then open, and allow heated air to pass into the room. According to the room temperature thereafter established, the flap element 17 of the damper may open and close several times during an on-peak period.

Thus, operation of the flap element of the damper does not entail consumption of electrical current from a source such as the on-peak source, the requisite energy being derived entirely from the store 10 and the heat stored in the atmosphere of the room itself.

It is desirable that at the beginning of an off-peak period, when electrial heating elements 10a, 10b providing heating for the store 10 are energised from the off-peak supply terminals, the flap element 17 should be closed promptly.

This may be achieved by routing current carrying leads from the heating element in proximity to the phial 34 and/or the bimetal strip 23. The small heating effect produced in the current carrying conductors, or one of them, can be sufficient to cause the strip to deflect downwardly and ensure closure of the flap element 17. Thus, one or more relatively low rated heating elements may be provided, one such being shown at 52, adjacent to the phial 34 and traversed by store charging current from the off-peak supply or by current automatically switched on from the off-peak supply when store charging current is supplied therefrom.

In the embodiment illustrated in FIGS. 2 and 3 parts corresponding functionally to those already described are designated by references with the prefix 1 and the preceding description is to be deemed to apply to these. Reference is made, therefore, only to the principal changes.

In this embodiment of the assembly the control means such as the damper 114 is biased into the closed position. such biasing may be provided by the weight of the flap element itself (the counterbalance weight being omitted if desired) and the adjustment screw 139 bears downwardly on a flange of the flap element on the side of the hinge 118 remote from the opening in the seat element.

The bimetal strip 123 of the arm 122 is arranged with its lower expansion component uppermost so that the bimetal strip 123 is caused to deflect upwardly when heated. Likewise, as hereinafter described, expansion of the transmitter element 132 of the second thermo-motive means sensing room temperature causes upward deflection of the arm 122.

Referring to the mounting means, this now comprises a mounting plate 129 which incorporates or to which is secured transversely extending arms 129a having slots 129g through which fastening elements may pass to secure it to any suitable fixed part of the heater structure.

A downwardly extending flange 129h at the forward end of the mounting plate 129 engages in slots 126a in a pair of side plates 126b of a carrier element 126 which can rock in a vertical plane about a pivot axis defined by the slots 126a and flange 129h in combination.

The carrier element has secured thereto the laterally spaced arms 126c of a stirrup, the connecting limb 126d of which has a tongue 126e secured by rivets to the rearward part of the bimetal strip 123.

The carrier element has a rearward extension 126f formed with a pocket for receiving a bellows 132 which forms the transmitter element of the second thermo-motive means sensing room temperature. The bellows 132 has an upwardly extending rod 132a provided with a ball 132b which reacts against a cam element 137 of an adjustment means 136, the spindle 138 of the latter being journalled in a bearing 129k in the plate 129. A plate 145 which has an opening through which the rod 132a projects with clearance, serves to retain the tube 135 in position and flange 129i limits angular movement of the arm 122 as a whole.

The operation of this assembly is as previously described except that increases in room temperature and in store temperature cause the arm 122 to be deflected upwardly. Also movement of the adjustment means 136 to its "coldest" position also causes upward deflection of the arm to take place.

In FIG. 4 there is illustrated a heater of the kind specified with the top and front panels removed and a further embodiment of the control means closely similar to the embodiment of FIGS. 2 and 3 also removed but with arrows showing its position of assembly.

Parts corresponding to those already described with reference to the embodiment of FIGS. 2 and 3 are designated by like references with the prefix 200.

The heater comprises an outer casing 240 containing the store (not visible) enclosed by insulating material 224.

Passageways extend vertically through the store from an inlet 209 at its lower end to an outlet at its upper end for the flow of air controlled by flap element 217.

The flap element 217 cooperates with seat element 215 (FIG. 5) and rests on the upper edges of a flange or frame 220 thereof.

The hinge means comprises a pair of upstanding lugs 218 passing with clearance through holes 218a in the flap element and having loose rings 218b preventing the flap element being lifted off the frame 220 but permitting it to hinge about an axis 220a defined by engagement of one of the flanges of the frame element extending longitudinally of the flap element and in the same, or approximately the same, vertical plane as the lugs 218.

The flap element has an upstanding flange 217a which is engaged by the free end of the bimetal strip 223 of arm 222. At its free end the bimetal strip 223 includes a transversely extending trough-shaped part 223a for contacting the upper edge of the flange 217a.

The control means is constructed and adapted to operate substantially as already described with reference to the embodiment shown in FIGS. 2 and 3. The bracket arms 229a are secured to the inturned lugs 241 of a generally U-shaped bracket 242 and secured to a top plate 243 resting on top of the thermally insulating material.

Parts of the control means are assembled as indicated by arrows. Thus, arrow 244 indicates the position of assembly of the bimetal strip 223 and assembly 221, arrows 245 indicate the position of assembly of tube 235 which is secured by means of clips 247 alongside a cable 248 conveying current to the heating elements (not seen) in the interior of the heat store, thereby providing for quick closure of the flap element 217 when its current is switched on. Arrow 246 indicates where the room temperature heat sensor 234 is assembled adjacent to the inlet 209 of the passageway extending upwardly through the store.

The whole of the front side of the casing is closed by front panel 288 but the underside of the casing has a grill 249 providing for inflow of air to the inlet 209 and the top cover plate of the casing 250 likewise has an outlet grille for emergence of air permitted to flow upwardly through the passageway of the store when the flap element 217 is in its open position.

It is to be noted that the first temperature sensing means, namely the bimetal strip 223 is mounted at a position at the upper end of the store encased in its insulating material 224 but within the casing 240. By reason of its proximity to the top plate 243 of the heat insulating material it will receive heat by radiation through this material but it will also be subjected to heating by air flow occurring convectively between the store and its heat insulating material on the one hand and the walls of the casing 240 on the other hand. This second complement of heating will occur predominantly when the flap element 217 is closed, that is during the off-peak period when the store is undergoing charging and during the early part of the on-peak period when the store is fully charged. Once the flap element 217 has opened, most of the circulating air will pass through the interior of the store which is provided with passageways for this purpose and will be deflected by the flap element 217 as it emerges through the upper ends of the store passageways to pass out of grille 251 and cover plate 250. The temperature of the air circulating by convection around the heat insulating material enclosing the store will of course depend to an appreciably extent upon the temperature of the air in the space or place to be heated as well as upon heat transmitted by radiation loss through the vertical sides of the heat insulating material. Conditions of operation are thus such that predominantly the bimetal strip 223 is influenced by store temperature but when the flap element 217 is closed the temperature of the space or place to be heated has somewhat more influence on the bimetal strip 223.

In the case of the second temperature responsive means, namely the heat sensor 234, this is placed directly in the path of incoming air flow from the space or place to be heated and entering the casing of the heater through the grille 249. Thus when the air flow is relatively extensive, as when the flap element 217 is open, the predominating influence to which 234 responds is the temperature of the incoming air from the space or place to be heated. When the flap element 217 is closed, however, then heat by radiation through the heat insulating material is a significant factor in heating the sensor 234, and assists in establishing contact pressure to keep the flap element 217 closed during charging in an off-peak period and early in the ensuing on-peak period.

It will be noted that in all embodiments of the assembly the thermo-motively energised means are subjected only to relatively low temperatures and, therefore, exase and complication which would be entailed in providing mechanically operating parts able to withstand high temperatures such as those to which the store is raised do not need to be provided. Further, as previously mentioned, energy for operation of the control means is derived from heat sources so that no current need be drawn from the supply during on-peak periods. Further, in both assemblies off-peak current may be used to provide additional heating for the bimetal strip and hence produce rapid closure of the flow control means at the onset of an off-peak period.

It will, of course, be understood that whilst it is simple and convenient to form the arm 23, 123, 223 as a bimetal strip the arm could comprise one or more elements of a form and so assembled as to provide deflection in the vertical plane without these elements of themselves being bimetal structures, and a separate bimetal member or structure may be provided to bring about the deflection. This arrangement could be adopted where the actual force required to operate the flow control means is rather greater than can be exerted by the free end portion of the bimetal strip. Thus, the latter could be arranged to operate on the air flow control means through a force multiplying mechanism of any appropriate form.

I claim:

1. In a heater which can be heated from a source of electricity available during an off-peak period, the heater comprising a body, a heat store within the body, electrical heating means for the store, air passages extending through the store from an inlet to an outlet, through which air is caused to flow in the operation of the heater, and flow control means mounted adjacent to the outlet for controlling flow of air through the heater, the improvement in which said flow control means is operated by an operating means comprising a first temperature responsive means mounted on the body and outside the heat store, and which is responsive to a temperature varying as a function of store temperature, and a second temperature responsive means mounted on the body and outside the heat store, and which is responsive to the temperature of air flowing through the inlet into the heater.

2. In a heater according to claim 1 in which both the first and second temperature responsive means each provide an output force with temperature rise for moving the flow control means to close the outlet.

3. The improvement according to claim 1 wherein both of said temperature responsive means comprise thermo-motive means each providing an output force for operating the control means.

4. The improvement according to claim 1 wherein said first means is mounted in relation to the heater at a position at which it partakes of temperature rise and temperature fall of the heat store but at which the maximum temperature to which said first means is subjected is substantially lower than the temperature of the heat store when the latter is fully charged.

5. The improvement according to claim 4 wherein the first means comprises a thermo-motive means including a heat sensing element which is mounted in thermal communication with the heat store through a material of low thermal conductivity.

6. The improvement according to claim 5 wherein:
    (a) the heat store is at least partly enclosed by heat insulating material,
    (b) said heat sensing element is mounted by said heat insulating material.

7. The improvement according to claim 1 wherein at least one of said temperature responsive means is also responsive to charging of said heat store to bring about movement of the flow control means towards or into a position of closure during charging.

8. The improvement according to claim 7 wherein said temperature responsive means comprises thermo-motive means responsive to heating by passage of an electrical current through it during charging of the heat store.

9. The improvement according to claim 1 wherein said first temperature responsive means is responsive predominantly to a temperature varying as a function of said store temperature but also to a lesser extent to the temperature of the space or place to be heated.

10. The improvement according to claim 1 wherein said second temperature responsive means is responsive predominantly to the temperature of the space or place to be heated but also to a lesser extent to a temperature varying as a function of the store temperature.

11. In a storage heater of the kind which can be energized by a supply of electricity made available during an off-peak period, the heater comprising a body, a heat store within the body, electrical heating means for the store, air passages extending through the store from an inlet to an outlet, through which air is caused to flow in the operation of the heater solely by convective pressure, flow control means mounted adjacent to the outlet for controlling flow of air through the heater, and an operating assembly for operating the flow control means, said operating assembly comprising:
    (a) a mounting means for mounting the assembly on the body;
    (b) an arm movably projecting from the mounting means and having a first part spaced there-along from the mounting means to co-operate with the flow control means, and a second part movably supported by the mounting means;
    (c) a first thermo-motive means comprising a heat sensing element located at a position at which it is responsive primarily to the temperature of the store, and which is operative to cause the first part of the arm to deflect and bring about movement of the flow control means from an open position towards a closed position in response to a rise of heat store temperature;
    (d) a second thermo-motive means comprising a heat sensing element located at a position at which it is traversed by air flowing through the inlet into the heater and an operating part operative between the mounting means and the arm for causing the arm to deflect and bring about movement of the flow control means from its open position towards its closed position in response to a rise in the temperature in the vicinity of said inlet.

12. An operating assembly according to claim 11 wherein the arm is formed as a bimetal member or structure.

13. An operating assembly according to claim 12 wherein said second part of the arm is supported from the mounting means for angular movement in response to operation of the second thermo-motive means acting effectively between the arm and the mounting means, deflection of the first part of the arm by virtue of heating of the bimetal member or structure, and deflection of the arm by virtue of temperature changes to which the second thermo-motive means responds having respective components of movement in a common plane.

14. In a heater according to claim 11 wherein the heat sensing element of the second thermo-motive means is mounted adjacent to the inlet at a position such that when the flow control means is closed, said second thermo-motive means is influenced to a greater extent by the temperature of the store, and when the flow control means is open, said heat sensing element of the second thermo-motive means is traversed by air flowing through the inlet into the heater and is under these circumstances influenced to a lesser extent by the temperature of the store, and to a greater extent by the temperature of the air flowing through the inlet into the heater, the two thermo-motive means in combination serving, when the temperature of the store is at or near to a maximum at the end of a charging period, to maintain the flow control means closed.

15. A heater which can be heated from a source of electricity available during an off-peak period, the heater comprising:
   a casing having an air inlet and outlet, a heat store within the casing, electrical heating means for the store, internal air passages extending through the store from the inlet to the outlet through which air is caused to flow in the operation of the heater, a covering of heat insulating material substantially enclosing said store, all mounted in said casing and defining an external passageway between said casing and said covering from the inlet to the outlet,
   flow control means mounted adjacent to the outlet for controlling flow of air through the heater, with said flow control means including an operating means comprising a first temperature responsive means mounted on the heater, and which is responsive to a temperature varying as a function of store temperature, and a second temperature responsive means mounted on the heater, and which is responsive to the temperature of air flowing through the inlet into the heater,
   the flow control means being operative to regulate air flow through said internal passageway but allowing free air flow through said external passageway between said inlet and said outlet,
   said first temperature responsive means being mounted firstly to receive heat transmitted from said store through said covering and thereby to respond to store temperature and secondly in a path of air flow through said external passageway and thereby to respond to the temperature of the space or place to be heated when air flow takes place through said external passageway, and
   said second temperature responsive means being mounted in a path of air flow into said internal passageway to respond to the temperature of the space or place to be heated when airflow takes place through said internal passageway, and also to receive heat transmitted from said store through said covering and thereby to respond to store temperature.

* * * * *